United States Patent [19]
Wang et al.

[11] Patent Number: 5,807,466
[45] Date of Patent: Sep. 15, 1998

[54] FUEL INJECTION SYSTEM AND METHOD FOR TREATMENT OF $NO_X$ IN A CORONA DISCHARGE POLLUTANT DESTRUCTION APPARATUS

[75] Inventors: John H. S. Wang, Rancho Palos Verdes; Nelson William Sorbo, Redondo Beach; Weldon S. Williamson, Malibu; Edward J. Palen, Marina Del Rey, all of Calif.

[73] Assignee: Hughes Electronics, El Segundo, Calif.

[21] Appl. No.: 689,996

[22] Filed: Aug. 19, 1996

[51] Int. Cl.$^6$ ....................................... A62D 3/00
[52] U.S. Cl. ............................. 204/177; 588/247
[58] Field of Search .............................. 204/177; 588/247

[56] References Cited

U.S. PATENT DOCUMENTS 5,084,078  1/1992  Suzuki et al. ............................ 55/122

OTHER PUBLICATIONS

Higashi et al, "Soot Elimination and $NO_x$ and $SO_x$ Reduction in Diesel–Engine Exhaust By a Combination of Discharge Plasma and Oil Dynamics", IEEE Transactions on Plasma Science, vol. 20, No. 1, Feb. 1992, pp. 1–12.

*Primary Examiner*—Kathryn L. Gorgos
*Assistant Examiner*—Kishor Mayekar
*Attorney, Agent, or Firm*—Leonard A. Alkov; William C. Schubert; Glenn H. Lenzen, Jr.

[57] ABSTRACT

In a gaseous pollutant destruction apparatus employing a corona discharge reactor for reducing nitrogen oxide compounds ($NO_x$), a fuel injection system provides a precisely controlled small quantity of hydrocarbon fuel to the corona discharge reactor to facilitate the destruction of $NO_x$.

9 Claims, 2 Drawing Sheets

FUEL INJECTION SYSTEM AND METHOD FOR TREATMENT OF $NO_x$ IN A CORONA DISCHARGE POLLUTANT DESTRUCTION APPARATUS

BACKGROUND OF THE INVENTION

1. Field of the Invention

This invention relates to a fuel injection system and method for the destruction of nitrogen oxide ($NO_x$) compounds in a corona discharge pollutant destruction apparatus.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the 1994 International Conf. on Plasma Science*, 6–8 Jun., 1994, Santa Fe, N. Mex., paper No. 1E6, page 88. Corona pollutant destruction has also been proposed for liquids, as disclosed in application Ser. No. 08/295,959, filed Aug. 25, 1994, "Corona Source for Producing Corona Discharge and Fluid Waste Treatment with Corona Discharge," and assigned to Hughes Aircraft Company, now doing business as Hughes Electronics, the assignee of the present invention.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in U.S. Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas," *Non-Thermal Plasma Techniques for Pollution Control*, NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

A block diagram of a generic single-stage corona discharge pollutant destruction apparatus is shown in FIG. 1. A corona discharge reactor 2 takes pollutant-bearing exhaust gas 12 from an engine 6 through an inlet conduit 8, treats the exhaust gas, and discharges the treated exhaust gas 14 through an outlet conduit 10. Major pollutants in the exhaust gas 12 from the engine 6 generally include various forms of nitrogen oxides ($NO_x$), hydrocarbons (HC), and carbon monoxide (CO). HC and CO are considered high energy level pollutants, which can be oxidized to produce water ($H_2O$) and carbon dioxide ($CO_2$). $NO_x$ compounds are considered low energy level pollutants, and need to absorb energy to be reduced to harmless diatomic nitrogen ($N_2$) and oxygen ($O_2$). When a power source 4 supplies high voltage pulses to the corona discharge reactor 2, HCs are oxidized to become $H_2O$ and $CO_2$, while CO is oxidized to become $CO_2$. At each voltage peak, corona charges are emitted within the reactor 2, producing free radicals that oxidize HC to generate $CO_2$ and $H_2O$ and CO to generate $CO_2$. In general, high voltage pulses are very effective in destroying HC and CO, but do not help the reduction of $NO_x$ into $N_2$ and $O_2$. Experiments have shown that corona generation using high voltages (up to 12 kV) may even produce some additional $NO_x$. On the other hand, low voltage pulses are highly efficient in reducing $NO_x$, but are poor at oxidizing HC.

Injection of either hydrocarbon additives or ammonia ($NH_3$) is a known method for substantial reduction of $NO_x$ compounds in corona discharge reactors. A general review of injecting $NH_3$ or hydrocarbon additives is provided in G. E. Vogtlin and B. M. Penetrante, "Pulsed Corona Discharge for Removal of $NO_x$ from Flue Gas," *Non-Thermal Plasma Techniques for Pollution Control*, NATO ASI Series Vol. G34, Part B, page 187, 1993. If $NH_3$ is injected, it reacts with acids formed in the reactor to i produce ammonia salts, which are then collected by either a filtration system or other particulate removal system. A disadvantage of this method is that accumulated solid ammonia salts must be removed periodically, and thus is inconvenient for automotive applications. Injection of hydrocarbon additives has been shown to be effective by recycling the hydroxyl radicals (OH) during the oxidation and reduction of NO. The efficiency of OH radical recycling is dependent upon the reaction rate of the hydrocarbon additive with the OH radicals, and is described in G. E. Vogtlin et al.

The injection of engine oil in a plasma reactor to treat diesel engine exhaust is described in M. Higashi et al., "Soot Elimination and $NO_x$ and $SO_x$ Reduction in Diesel-Engine Exhaust by a Combination of Discharge Plasma and Oil Dynamics," *IEEE Transaction on Plasma Science*, Vol. 20, No. 1, 1992. The article reported removal of $NO_x$ from diesel engine exhaust by use of discharge plasma in a reactor injected with drops of engine oil. Once the engine oil is in the chamber, the plasma generates a fine oil mist which stimulates reduction of soot as well as $NO_x$ and $SO_x$ compounds.

SUMMARY OF THE INVENTION

The present invention provides a system for injecting fuel into a corona discharge $NO_x$ reduction reactor to facilitate the reduction of $NO_x$ compounds into $N_2$ and $O_2$. The system is applicable to a corona discharge pollutant destruction apparatus that has one or more corona discharge reactor stages dedicated to reducing $NO_x$ compounds. One advantage of using fuel to supply hydrocarbons to destroy $NO_x$ in reduction reactors is that the fuel can be the same as that used for combustion in the engine, thus greatly simplifying fuel storage.

In a preferred embodiment, a computerized control module analyzes the types and amounts of pollutants in the engine's exhaust gas from an exhaust sensor and determines the amount of fuel needed to effectively destroy $NO_x$ in reduction reactors. The control module precisely controls the rate of fuel transfer from a pump that feeds the fuel to the reduction reactors.

These and other features and advantages of the invention will be apparent to those skilled in the art from the following detailed description, taken together with the accompanying drawings, in which:

DETAILED DESCRIPTION OF THE INVENTION

The present invention provides a fuel injection system and method for supplying hydrocarbons to a corona discharge $NO_x$ reduction reactor to facilitate the destruction of $NO_x$. It is preferably implemented in one or more corona discharge reactors dedicated to the reduction of $NO_x$ compounds in a multi-stage corona discharge pollutant destruction apparatus. A major advantage of implementing the invention in a multi-stage apparatus is that at least one of the stages can be designed primarily to treat $NO_x$ without simultaneously concerning itself with HC and CO oxidation, the requirements of which conflict with the requirements for $NO_x$ reduction. For example, oxidation of HC and CO generally requires corona generation by high voltage pulses, whereas the optimum voltage for $NO_x$ reduction is usually lower. Therefore, it is preferred that this invention be implemented in a corona discharge reactor that is primarily concerned with the reduction of $NO_x$.

When a reduction reactor is preceded by an oxidation reactor, it is desirable to have a small quantity of HC left over by the oxidation reactor to provide energy for the reduction of $NO_x$ in the reduction reactor. However, if the oxidation of HC is too efficient, not enough HC may be left over. In accordance with the invention, fuel is injected into one or more of the reduction reactors to supply hydrocarbons which facilitate the reduction of $NO_x$ compounds by releasing the energy needed to break down the $NO_x$ molecules to form $N_2$ and $O_2$.

Figure 1:
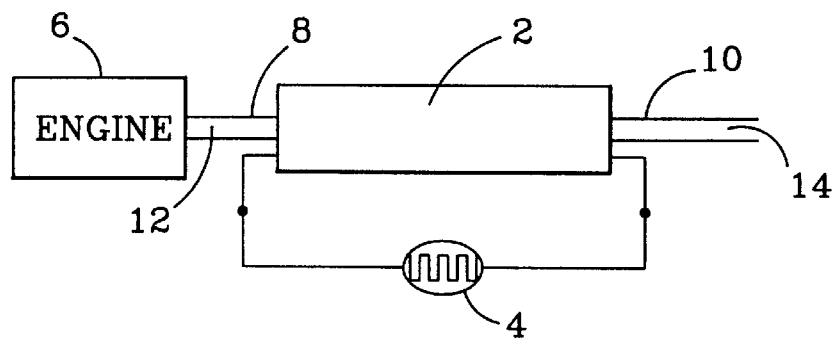
FIG. 1, described above, is a block diagram of a conventional corona discharge pollutant destruction apparatus.
Figure 2:
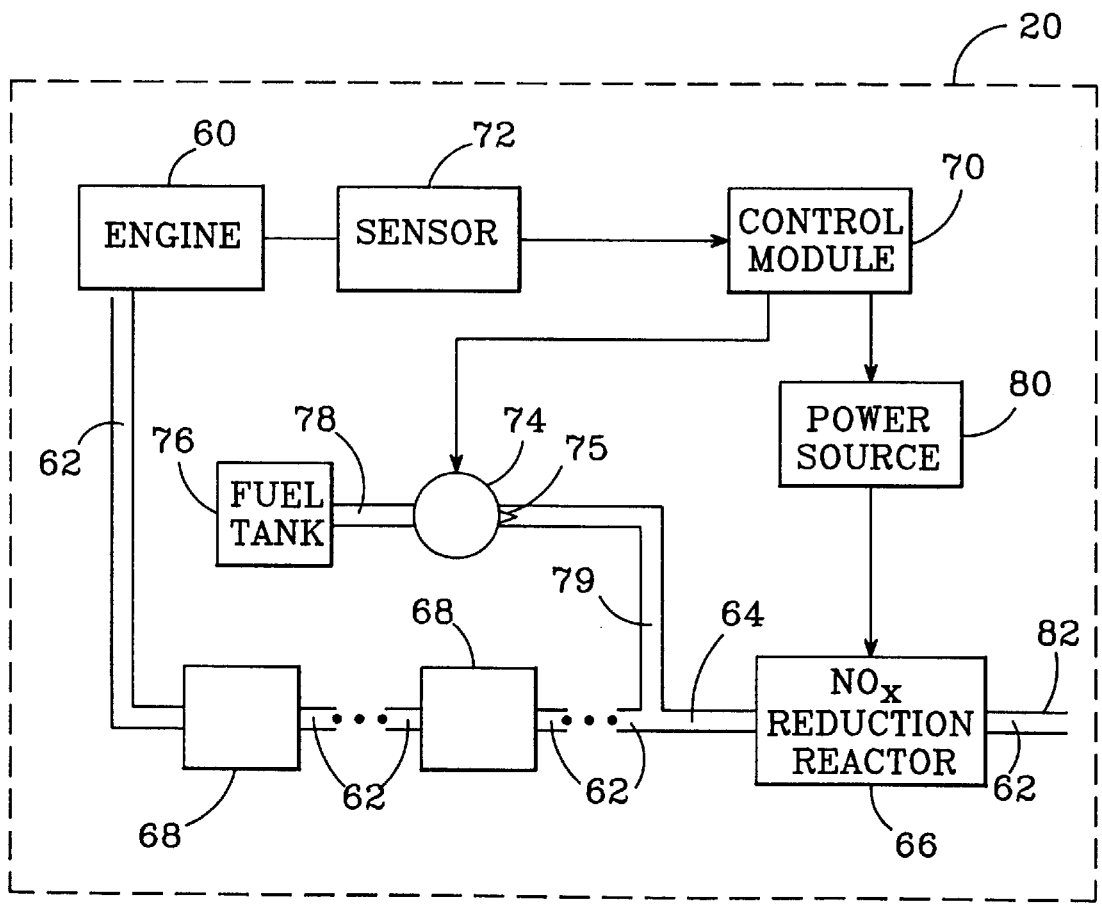
FIG. 2 is a block diagram of a fuel injection system for a corona discharge $NO_x$ reduction reactor in an automobile.

As shown in FIG. 2, an automobile 20 has an internal combustion engine 60 that emits an exhaust gas 62 which contains a mixture of harmless gasses such as $CO_2$, $H_2O$, $N_2$ and $O_2$, and pollutants such as CO, HC, and $NO_x$. The exhaust gas 62 passes through an inlet conduit 64 of a corona discharge reactor 66 which is designed to reduce $NO_x$ compounds. Preferably, the exhaust gas 62 is treated by one or more stages of corona discharge reactors 68 which oxidize the high energy level pollutants such as HC and CO and, if required, by one or more stages of reduction reactors for a partial treatment of $NO_x$ compounds before it reaches the $NO_x$ reduction reactor 66. The $NO_x$ reduction reactor 66 has an outlet conduit 82 which discharges the treated exhaust gas 62 either to the atmosphere, or to another reactor stage for further pollutant treatment.

A fuel tank 76 stores the fuel that is to be injected into the $NO_x$ reduction reactor 66. The fuel tank 76 is preferably the same as the one that supplies the fuel for combustion in the engine, thus eliminating the need for a separate fuel storage. In a preferred embodiment, a fuel pump 74 that conveys fuel 78 from the fuel tank 76 to the reduction reactor 66 is equipped with a nozzle 75 which sprays the fuel 78 to form a mist 79. The fuel mist 79 is then vaporized by the high temperature of the hot exhaust gas 62 from the preceding reactor stages 68, and is mixed with the exhaust gas 62 in the inlet conduit 64. The fuel is combined with hydrocarbons that remain after treatment by the previous oxidation stages, and the combined fuel vapor and the remaining hydrocarbons in the exhaust gas 62 enhance the reduction of $NO_x$ compounds into diatomic $N_2$ and $O_2$ in the reactor 66. With this configuration the fuel 78 has enough time to evenly mix with the exhaust gas 62, so that all portions of the $NO_x$-bearing exhaust gas 62 can be thoroughly treated.

In a preferred embodiment, the fuel pump 74 is a precision pump capable of being controlled by a computerized control module 70, which preferably reads input data from an engine sensor 72 that measures several parameters from the engine 60, including the exhaust temperature and the amounts of CO, HC and $NO_x$. The computerized control module 70 determines the amounts of various $NO_x$ compounds, including NO and $NO_2$, and computes the amount of fuel required to effectively destroy the $NO_x$ compounds in the $NO_x$ reduction reactor 66. Based upon the computed amount of fuel to be injected into the $NO_x$ reduction reactor 66, the control module 70 determines the power required to drive the precision fuel pump 74 so that fuel is transferred to the $NO_x$ reduction reactor at the desired rate. The control module 70 adjusts the rate of fuel flow into the reduction reactor 66 by sending commands to adjust the power of the fuel pump 74.

To increase the efficiency of $NO_x$ reduction in the reactor 66, the control module 70 also controls a power source 80 which generates power for the $NO_x$ reduction reactor 66. The power source 80 preferably generates a substantially sinusoidal pulse-modulated voltage waveform. The average power of corona generation can be adjusted by varying the oscillation frequency and/or the duty cycle, which is defined as the product of the pulse width and the pulse repetition frequency. The control module 70 computes values for the power source's power generation characteristics, such as voltage, oscillation frequency, pulse width and pulse repetition frequency, that when combined with the computed rate of fuel flow will provide an efficient treatment of $NO_x$ in the reduction reactor 66.

Although the invention is better suited to a multistage corona discharge apparatus, it is also applicable to a single-stage apparatus that is primarily concerned with the reduction of $NO_x$. The voltage for corona generation that is desirable for the reduction of $NO_x$ is usually lower than the desired voltage for the oxidation of HC and CO. In a single-stage reduction reactor, the voltage is low enough, preferably in the range of about 5–10 kV, so that the fuel, which provides energy for the reduction process, is not oxidized by a high-voltage corona. A single-stage apparatus with fuel injection is feasible for treating pollutants that include predominantly $NO_x$ and relatively small amounts of higher energy level pollutants such as HC and CO.

The present invention should be well suited for future automotive electronic catalytic converters which are expected to employ corona discharge pollutant destruction reactors to meet stringent air quality standards. Because the fuel for $NO_x$ reduction is the same as that for combustion in the engine, no separate storage is needed, thus greatly simplifying hardware manufacture, vehicle operation and maintenance, as well as reducing the cost to automobile buyers.

Figure 3:
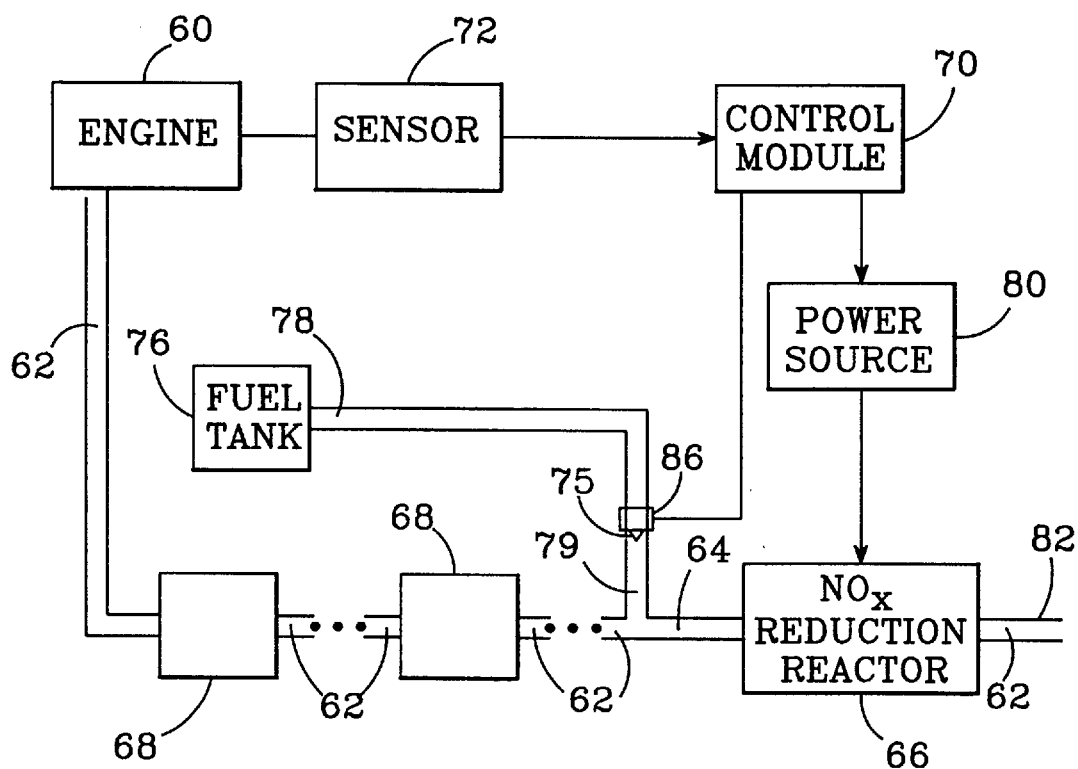
FIG. 3 is a block diagram of a fuel injection system similar to that of FIG. 2, but with a precision controlled fuel valve instead of a pump.

In another embodiment, the fuel tank is positioned higher in altitude than the $NO_x$ reduction reactor such that the fuel can be transferred to the reactor by gravity, as shown in FIG. 3, to eliminate the need for a fuel pump. A precision controlled valve 86 is controlled by the computerized control module 70, which adjusts the rate of fuel flow of the valve 86 according to the inputs from the sensor 72, which senses the amounts of $NO_x$ produced by the engine 60. A nozzle 75 is preferably placed downstream of the precision valve 86 to spray the fuel 78 to form a mist 79, which is then mixed with the exhaust gas 62 and vaporized by its hot temperature to form a fuel vapor in the inlet conduit 64. The fuel vapor and the remaining hydrocarbons in the exhaust gas enhance the reduction of $NO_x$ in the reactor 66.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for reducing $NO_x$ in an exhaust gas from a pollutant generator powered by a fuel, comprising the steps of:

introducing said exhaust gas into a corona discharge reactor;

injecting said fuel into said corona discharge reactor;

applying a corona discharge to said exhaust gas and said fuel within said reactor such that the application of said corona discharge to said fuel releases energy in said fuel; and reducing said $NO_x$ into $N_2$ and $O_2$ in said reactor with the energy released from said fuel.

2. The method of claim 1, further comprising the steps of:

converting said fuel to a mist;

mixing said mist with said exhaust gas; and providing said mixture to said reactor to reduce $NO_x$ in said exhaust gas.

3. The method of claim 1, further comprising the step of controlling the injecting of said fuel into said corona discharge reactor at a selected rate.

4. The method of claim 3, wherein said rate of fuel injecting is dynamically controlled to conform to a quantitatively determined rate.

5. The method of claim 4, wherein said quantitatively determined rate of fuel injecting is determined by:

sensing the $NO_x$ content of said exhaust gas; and computing a desired rate of fuel injecting required to effectively reduce said $NO_x$ content.

6. A method of reducing the $NO_x$ content within an exhaust that is formed by combusting a hydrocarbon fuel, comprising the steps of:

applying a corona discharge to reduce $NO_x$ in said exhaust; and injecting a fuel which is the same fuel used in said combusting into said discharge to provide additional energy for the $NO_x$ reduction.

7. The method of claim 6, further comprising the step of controlling the injecting of said fuel into said reactor at a selected rate.

8. The method of claim 7, wherein said rate of fuel injecting is dynamically controlled to conform to a quantitatively determined rate.

9. The method of claim 8, wherein said quantitatively determined rate of fuel injecting is determined by:

sensing the $NO_x$ content of said exhaust; and computing a desired rate of fuel injecting required to effectively reduce said $NO_x$ content.

* * * * *